United States Patent [19]

Sonnenschein et al.

[11] 4,062,912
[45] Dec. 13, 1977

[54] STEAM CONDENSATION SYSTEM

[75] Inventors: Hans Sonnenschein; Felix Pohl, both of Essen, Germany

[73] Assignee: Ludwig Taprogge Reinigungsanlagen fur Rohren-Warmeaustauscher, Angermund, Germany

[21] Appl. No.: 566,127

[22] Filed: Apr. 8, 1975

[30] Foreign Application Priority Data

Apr. 9, 1974 Germany .............................. 2417163

[51] Int. Cl.² ................................................ B01F 3/04
[52] U.S. Cl. .................................... 261/116; 261/118; 261/DIG. 10
[58] Field of Search ................ 261/76, 116, DIG. 10, 261/DIG. 32, DIG. 33, DIG. 75, DIG. 76, DIG. 13, 77, 115, 118, 112; 165/110–115; 122/262

[56] References Cited

U.S. PATENT DOCUMENTS

| 968,332 | 8/1910 | Dow | 261/116 X |
|---|---|---|---|
| 1,004,664 | 10/1911 | Leblanc | 261/DIG. 10 |
| 1,312,898 | 8/1919 | Ehrhart | 261/116 |
| 1,557,399 | 10/1925 | Bancel | 261/116 |
| 2,353,195 | 7/1944 | Sims | 261/77 |
| 2,481,959 | 9/1949 | Wahlin | 261/116 X |
| 2,550,683 | 5/1951 | Fletcher et al. | 261/116 X |
| 3,181,287 | 5/1965 | Rabson | 261/116 X |
| 3,608,274 | 9/1971 | Stingelin et al. | 261/116 X |
| 3,801,077 | 4/1974 | Pearson | 261/DIG. 76 |
| 3,911,067 | 10/1975 | Chen et al. | 261/DIG. 10 |

FOREIGN PATENT DOCUMENTS 2,371 of 1909 United Kingdom ........ 261/DIG. 32

*Primary Examiner*—Tim R. Miles
*Assistant Examiner*—Richard L. Chiesa
*Attorney, Agent, or Firm*—Karl F. Ross

[57] ABSTRACT

Water is continuously circulated in a closed stream through a plurality of vertically juxtaposed passages. Steam is introduced at the upstream ends of these passages and is drawn along the passages by the water so as to directly contact this water and condense. A restriction provided in each of the passages insures good condensation so that only gaseous noncondensable and nonsoluble portions of the incoming steam are drawn off at the downstream end of the passages where only the water is allowed to pass out.

1 Claim, 3 Drawing Figures

STEAM CONDENSATION SYSTEM

FIELD OF THE INVENTION

This invention relates to the condensation of steam and, more particularly, to an apparatus for condensing steam emerging from a power-plant turbine or the like.

BACKGROUND OF THE INVENTION

In the large-scale generation of electricity a considerable quantity of low-pressure steam frequently results and this steam must be condensed. Since the energy of the steam is extremely low it is mere condensation that is sufficient, no consideration need be given to recovering some of the energy from the steam.

Thus it is common practice simply to pass the steam upwardly in a scrubbing tower. Water, usually derived from a river, lake, or the like, is sprayed downwardly contercurrent to the rising column of steam so as to condense this steam. Such a system has the considerable disadvantage that a relatively large and complicated installation is necessary. Furthermore a relatively low efficiency is obtained because it is necessary to operate this condensing tower with a relatively small gas head, since any back pressure in the condensing tower would adversely effect the operation of the upstream gas turbines for electric generating.

OBJECTS OF THE INVENTION

It is thus an object of the present invention to provide an improved method of and apparatus for condensing steam.

Another object is the provision of such a system which is of relatively reduced size and wherein high efficiency is obtained.

Yet another object is the provision of an improved steam condenser.

SUMMARY OF THE INVENTION

These objects are attained according to the present invention in a method of condensing steam comprising the steps of circulating a closed continuous stream of water through a passage, including a current of steam to flow through the passage, directly contacting the steam with the stream of water in the passage, and collecting the condensate in the water.

According to another feature of this invention the current of steam and the water are displaced in the same direction through the passage and the current of steam is compressed as it passes through the passage, from upstream and to downstream end, so as to raise its temperature and pressure and insure better condensation and heat transfer between the water and the steam.

According to the present invention the steam condensation does not take place at a point on the so-called steam chart, but within a range along the saturation line of the chart. As a result of the slowing-down of the condensing steam in the condensation canal the pressure and temperature of this current of steam is increased so as to maximize condensation thereof. Thus the condensation passage in effect acts as a diffuser.

According to the present invention it is possible to achieve a considerably higher efficiency than is the conventional drip towers and spray towers. Less water is needed than in hitherto known devices and many noxious but water-soluble gases can easily be stripped out the of incoming steam-carrying current.

In accordance with yet another feature of this invention the downstream end of the passage is substantially blocked that only the stream of water can flow therefrom. Since virtually all of the steam in the incoming current is condensed, any nonsoluble gases can be removed immediately upstream from this downstream end of the passage. It is also within the scope of this invention to construct the device so that the gases are driven into the stream of water in the form of bubbles, these gases subsequently being drawn off at the top of the water manifold. This water is preheated and can ideally be used as boiler-feed water.

BRIEF DESCRIPTION OF THE DRAWINGS

The above and other objects, features, and advantages of the invention will become more readily apparent from the following description, reference being made to the accompanying drawing, in which.

SPECIFIC DESCRIPTION

Figure 1:
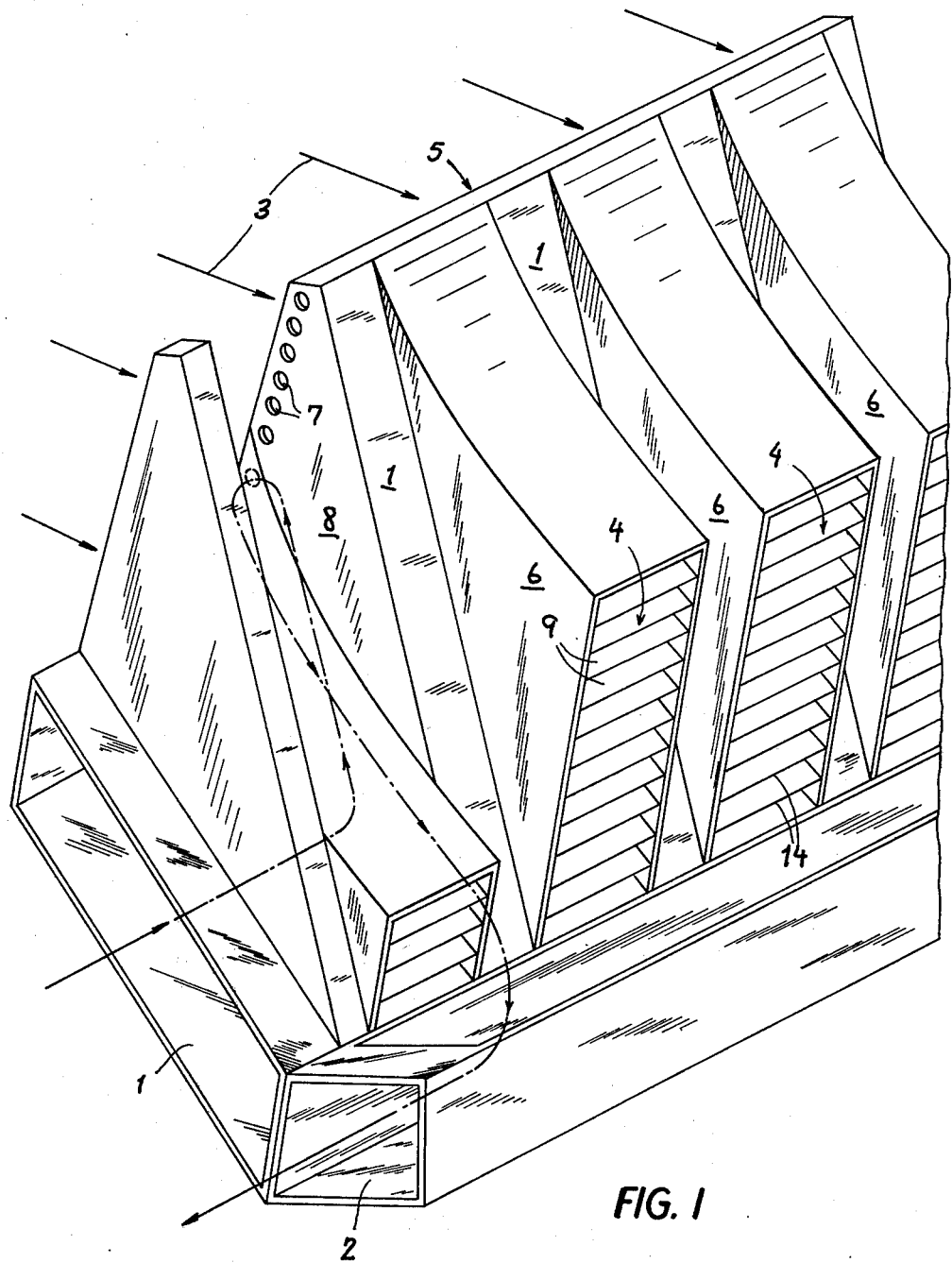
FIG. 1 is a perspective view of the arrangement according to the present invention.

The apparatus according to the present invention basically comprises a water distributor 1, a water collector 2, and a steam feed 3. A multiplicity of individual condensation units 4 is connected to the water distributor 1 and open up above the water collector 2. In addition a manifold 5 is provided for feeding the steam into these units 4.

As shown in FIG. 1 these units 4 have passages 9 of rectangular cross-section and are arranged in stacks or registers and are connected via wall openings 7 at the upstream end of the walls 8 of the registers 6. The collector 2 is provided below the downstream end of the registers 6 so that a stream of water flowing through the passages 9 formed between the upper and lower walls 14 of each passage 4 flow out of the downstream end of the passage into the collector 2.

The passages 9 extend generally horizontally and are downwardly concave with their upstream ends slightly above their downstream ends so that the water therein flows gavitationally from the upstream to the downstream end. In addition each passage 9 is provided on its upper wall 14 with a restriction body 10 that considerably reduces the flow cross-section of each passage 9. It is also within the scope of this invention to provide on the lower wall 14 upright turbulenceinducing pins 10'. A flap 11 is provided at the downstream end of each passage 9 to prevent gas flow out of the passage 9. Gas is collected via a conduit 12 opening inside each passage 9 at the downstream end thereof. The stream of water enters each passage 9 underneath a generally horizontal porous flap 13 which allows a certain amount of condensation while neatly channeling the water into the bottom region of the respective passage 9. It should be noted that the walls 14 of the passage are internally roughened so as to create a certain amount of turbulence and insure good mixing and condensation.

Figure 2:
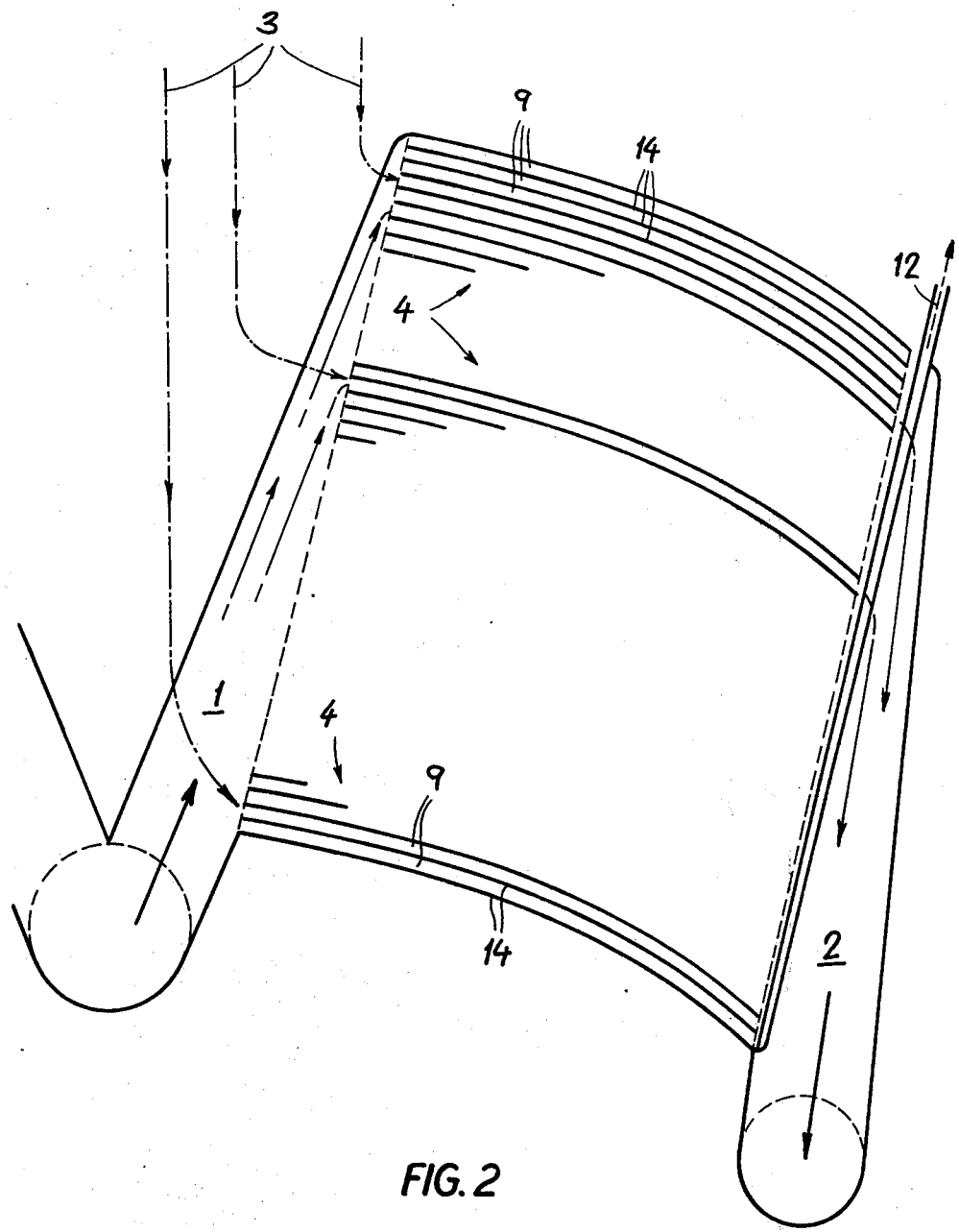
FIG. 2 is a flow diagram showing the same operation of the apparatus of FIG. 1.
Figure 3:
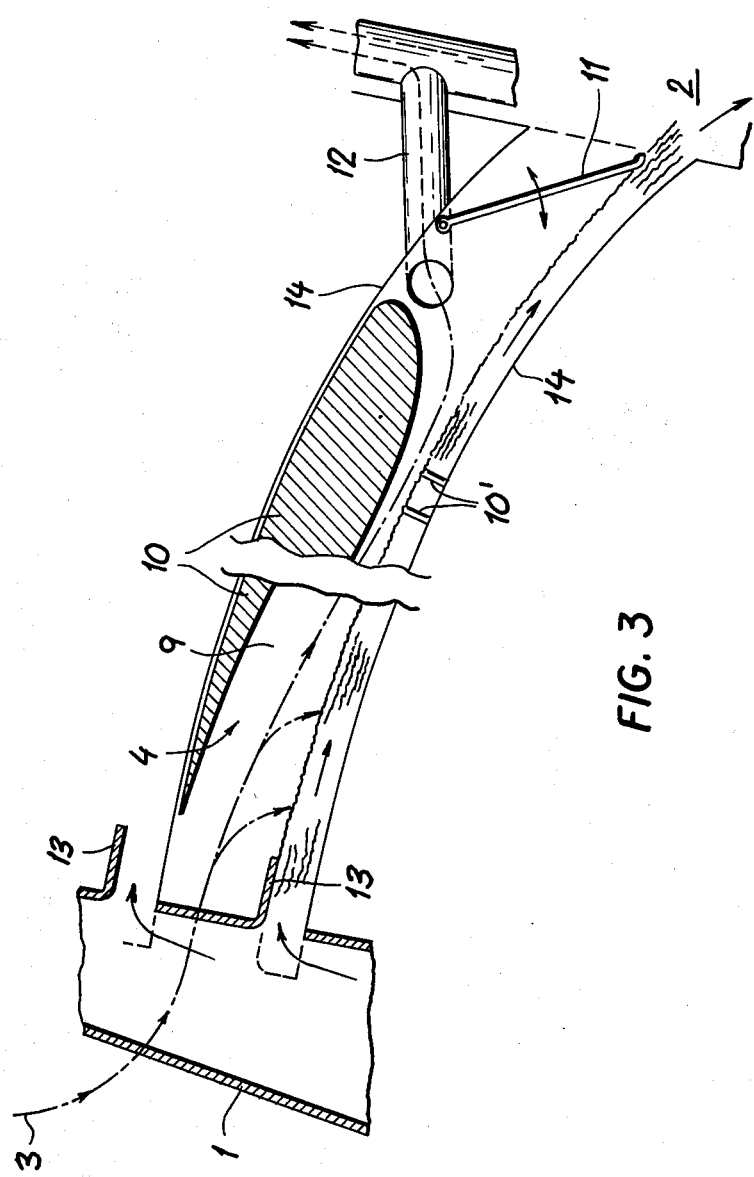
FIG. 3 is a large-scale sectional view illustrating operation of the apparatus of FIG. 1.

As shown in FIG. 2 the steam indicated by arrows 3 enter the passages 9 with a relatively high speed and condenses on the codirectionally flowing water entering at the openings 7. The temperature of this water increases as the water picks up the heat of condensation while at the same time the steam temperature and therefore the saturation pressure are raised as a result of the conversion of kinetic into static energy as the gas flows downstream in each channel 4. It is possible to provide an adjustable constriction element 10 if desired.

While the steam condenses into water and is partially condensed on the walls 14 of the passages 9 the nonsoluble or non-condensable gaseous phase of the incoming steam remain above the water level in the passages 4. This is withdrawn at the downsteam end immediately upstream of the floating flap 11 through the conduit 12.

Corresponding to the respective Reynolds number the steam flows in laminar fashion while the water flows turbulently through the passages 9. In the Reynolds number region for the water it is possible to obtain by use of a roughened inner surface a resistance coefficient independent of the viscosity of the water and therefore of the water temperature so that this coefficient remains constant. In addition the above-mentioned turbulence increases the heat transfer with water.

We claim:
1. A steam condenser comprising:
- a stack of elongated ducts, a water manifold at one side of said stack for feeding water in respective streams to said ducts;
- a steam manifold at said side of said stack for feeding respective flows of steam to said ducts whereby said steam passes through each of said ducts in codirectional flow with the water therein whereby said water is progressively heated by the heat of condensation of the steam as the water and steam flow along said ducts;
- means including a respective body within each of said ducts progressively constricting the steam flow cross-sections of each of said ducts from the upstream to the downstream ends thereof;
- a collection manifold on the other side of said stack communicating with each of said ducts for withdrawing water therefrom, each of said ducts being generally of rectangular cross section, horizontal and formed with an upwardly convex curvature;
- a flap at the downstream end of each of said ducts for limiting flow therefrom into the last-mentioned manifold exclusively to water; and
- a tube connected to each of said ducts at a downstream end thereof between the respective body and flap for removing gas therefrom.

* * * * *